Oct. 4, 1938.   F. R. HIGHT   2,132,002
CONSTRUCTION OF HUBS
Filed April 11, 1934   7 Sheets-Sheet 1

INVENTOR
Franklin R. Hight
BY John P. Tarbox
ATTORNEY

Oct. 4, 1938.  F. R. HIGHT  2,132,002
CONSTRUCTION OF HUBS
Filed April 11, 1934  7 Sheets-Sheet 2

INVENTOR.
FRANKLIN R. HIGHT.
BY John P. Tarbox
ATTORNEY.

INVENTOR.
FRANKLIN R. HIGHT.
BY John P. Fox
ATTORNEY.

Oct. 4, 1938.　　　F. R. HIGHT　　　2,132,002
CONSTRUCTION OF HUBS
Filed April 11, 1934　　　7 Sheets-Sheet 4

INVENTOR
FRANKLIN R. HIGHT
BY
ATTORNEY

Oct. 4, 1938.　　　F. R. HIGHT　　　2,132,002
CONSTRUCTION OF HUBS
Filed April 11, 1934　　　7 Sheets-Sheet 6

INVENTOR
FRANKLIN R. HIGHT
BY
ATTORNEY

Oct. 4, 1938.  F. R. HIGHT  2,132,002
CONSTRUCTION OF HUBS
Filed April 11, 1934  7 Sheets—Sheet 7

INVENTOR
FRANKLIN R. HIGHT.
BY
ATTORNEY

Patented Oct. 4, 1938

2,132,002

UNITED STATES PATENT OFFICE 2,132,002

CONSTRUCTION OF HUBS

Franklin R. Hight, Detroit, Mich., assignor to Budd Wheel Company, Philadelphia, Pa., a corporation of Pennsylvania Application April 11, 1934, Serial No. 719,992

5 Claims. (Cl. 29—159.3)

My invention relates to the construction of, method of making, and the means for the constructing of hubs and more particularly the outer hubs of wire spoked wheels from sheet metal and the article itself.

One object of my invention is to simplify the construction of outer hub shells, to simplify the construction of hub shells having laterally extended inner recesses without recourse to pressure initiated or applied inside the shells, and without the employment of an inner die having lateral dimensions greater than the smallest inner diameter of the shells. Other objects of this invention are the simultaneous operation of a plurality of forming or die stamping functions by one effort or one operation, whereby to reduce the number of times the hubs must be handled. Other features of my invention resolve themselves about the elimination of objectionable hydraulic pressure applied interiorly of the hub shells during the bulging operations, and the construction of the dies so as to avoid the need for positioning female dies interiorly of the hub shell, and the utilization in the bulging of large dimensional hub shells of internal deformable, non-compressible die parts of such construction and dimension as to effectually complete the inner die dimensions at the completion of the bulging operation by the use of yieldable non-compressible mediums. Other features of the invention reside in various and sundry combinations of the foregoing and other items not specifically enumerated.

I attain the foregoing and other objects preferably by three steps involving the blanking and pre-forming of a part, the bulging and forming of the part, and the trimming, piercing and coining of the parts. Although this order of procedure is preferable, variations thereof are conceivable, for example, blanking and pre-forming in one operation, bulging and piercing in another operation, trimming and coining in the third. Still further combinations of the steps and of somewhat less desirable order may be blanking and pre-forming, piercing, bulging, trimming and coining.

Previous methods of making hub shells, involving different die constructions, utilized up to six different operations and utilized frequently two men for each operation with a small production in the neighborhood of about 250 hub shells per hour. The present preferred method involves the utilization of three operations and five operators instead of twelve with a production of about 500 hub shells per hour. Previous methods utilized water pressure interiorly of the hub shells, which of necessity, was a slow and very messy procedure, whereas the present invention avoids such objectionable features.

The pre-formed contour of the blank of my invention prior to the bulging operation is a vital element in the satisfactory accomplishment of the subsequent steps and the attainment of a properly contoured hub shell with a small number of operations. Upon the suitable contouring of the pre-forming operations greatly depends the satisfactory accomplishment of bulging, without expanding punches interiorly of the parts. It should be further emphasized that the construction of the dies is likewise a vital item in accomplishing the desired objects.

The invention will be better understood when considered in connection with the accompanying drawings wherein like ordinals represent corresponding parts in the various figures, and wherein.

Figure 1:
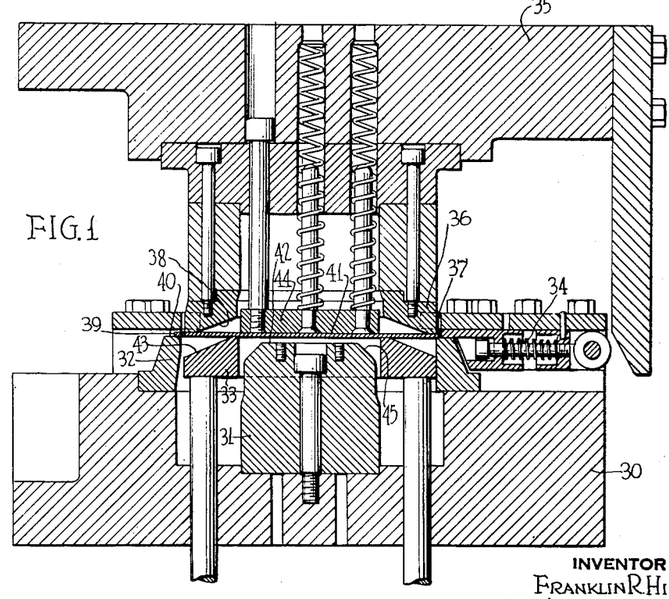
Fig. 1 shows, by transverse vertical section therethrough, the initial positioning of the flat strip stock in the pre-forming dies.
Figure 2:
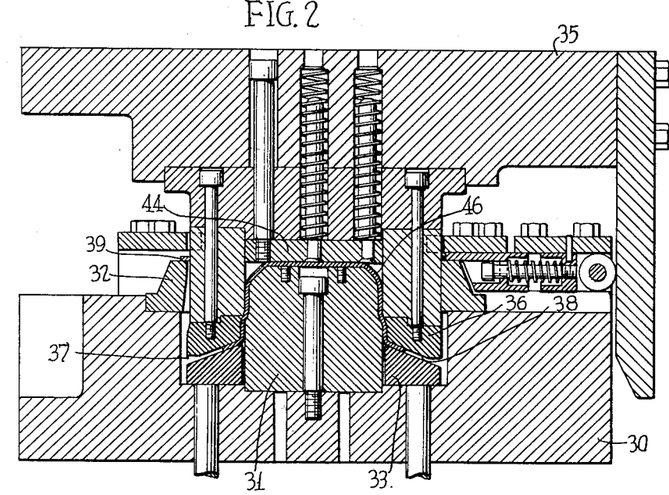
Fig. 2 shows likewise in transverse vertical section the blanking and pre-forming operations of these dies.
Figure 16:
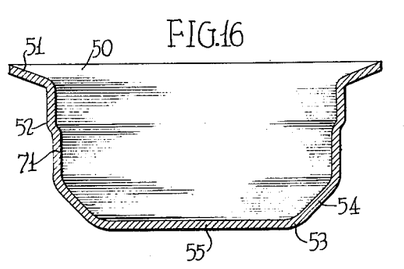
Figs. 16, 17, 18 show the blank in the various steps.

In Figs. 1 and 2 I have shown the preferred manner of pre-forming the parts utilizing a blanking and pre-forming step in one set of composite dies. In these figures I have illustrated a die shoe 30 arranged for securement to the bed of a suitable press. Positioned upon this die shoe and fixed thereto is a male die member 31, and a ring die 32 having a cutting edge. Concentric with and positioned between the die members 31 and 32 is an additional ring die 33 movably secured relatively to the lower die shoe. Positioned upon and secured to the lower die shoe is a resilient or yielding gauge and strip stock holding device 34 which retains the strip stock in position in the dies. Above the lower die is an upper die shoe 35 which carries a ring die 36 having a cutting edge 37 and a forming surface 38. During the operation of this set of dies a sheet metal strip 39 is pushed into the press between the dies, and automatically positioned by the resilient and gauging members 34. The press starts and the ring die 36 with its cutting edge 37 cooperates with the cutting edge 40 of the ring die 32 to punch or stamp a disc shaped blank 41 from the flat strip stock 39, the die movement continues and the upper die parts continue their downward movement and the disc member 41 is forced against the upper surface 42 of the male die 31, after which the downward movement of the ring die 36 and its drawing surface 38, cooperating with the lower ring die 33 and its drawing surface 43, begins the gradual drawing and pre-forming steps to provide a substantially bell-shaped blank having an inclined outwardly flaring flange at its open end, a generally cylindrical body portion extending from said flange toward the closed end, an inwardly inclined portion extending from said generally cylindrical portion and a flat closed end portion connecting the margins of said inclined portion. This operation is not complete until the blank, held centrally between the upper die portion 44 comprising a pressure pad and automatic stripper and the die member 31, has its marginal portions gripped between die rings 33 and 36 and in the final movement of the dies, the bell shaped contouring on the lower die surface 45 is completed, as is readily visible at 46 in Fig. 2. The operation having been completed, the upper die rises and by means of the rising of the ring die 33 the pre-formed blank is removed. The completed blank from this operation or the pre-formed blank is shown in Fig. 16. Upon the design and contouring of the male die member 31, or the punch as it may be variously called, depends the success of operation No. 2 called the bulging operation.

Figure 20:
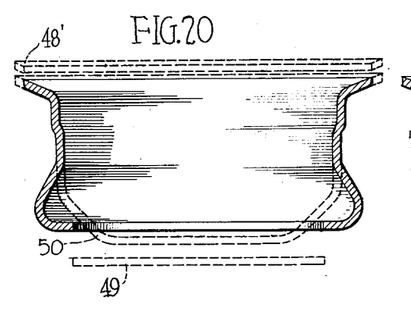
Fig. 20 shows a composite illustration of the preferred method.

As shown in Fig. 16 and in dotted lines in Fig. 20, this pre-formed blank 50 has an outturned inclined flange portion 51, a substantially cylindrical portion 52 and a substantially bullet nosed portion at the closed end 53 having an angularly extending side wall portion 54 and the flat portion 55. The complete blank 50 is of substantially bell shaped form. It will be likewise observed that the axial depth of the blank of Fig. 16 is materially greater than the axial depth of the hub shell in final form, as seen in Fig. 20 in full lines. The next operation or bulging by the preferred mode of procedure changes the form of the blank of Fig. 16 to that of Fig. 17, whereas by a slightly different order of procedure, the blank of Fig. 19 may result from the operation when bulging and piercing are combined in one step and/or where piercing and bulging comprises two consecutive steps of the order named. These latter two variations are usable, but the first described procedure of bulging in this operation alone is preferred.

Figure 3:
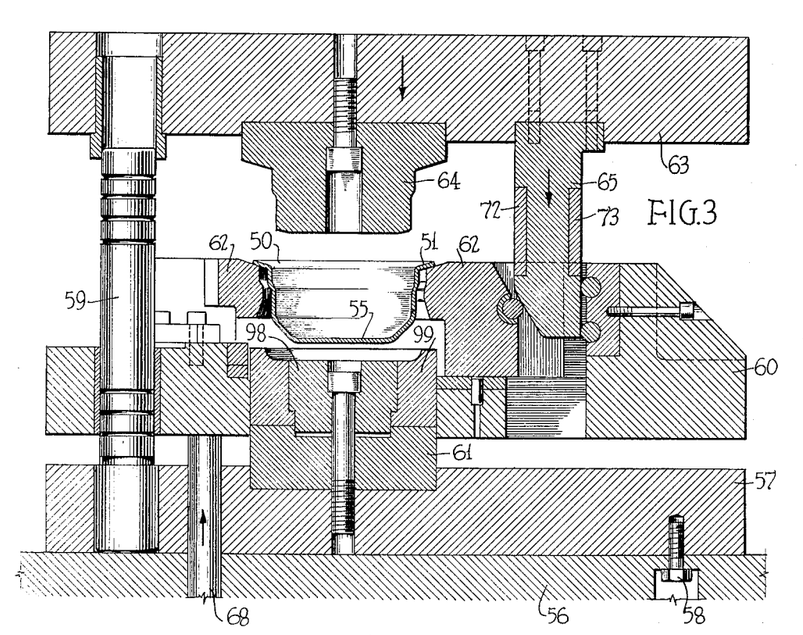
Figs. 3, 4, 5, 6 and 7 show, by similar views of the bulging dies, the steps of bulging.
Figure 4:
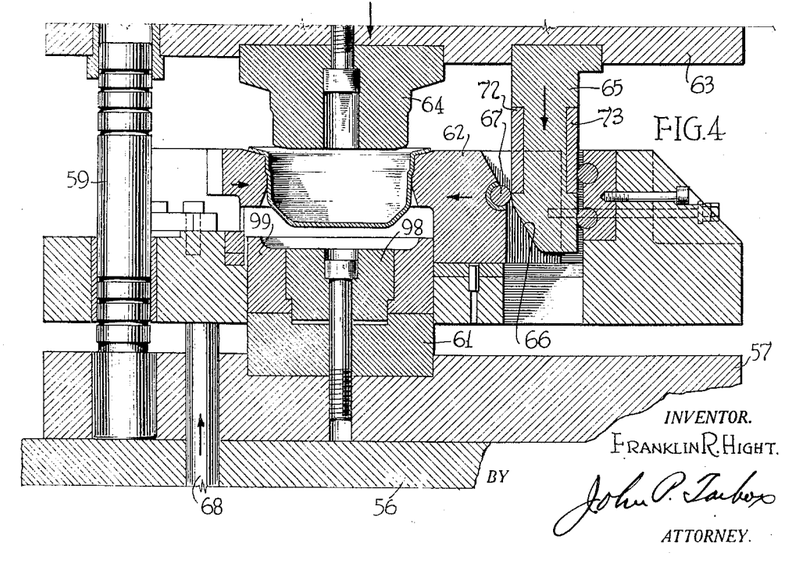

In the bulging operation the various steps are shown by Figs. 3 to 10, inclusive, concerning the various die operations. In Fig. 3 are shown the various parts during the initial operation. The bed of the press 56 has mounted thereon a lower die shoe 57 which is secured by suitable bolts 58. Secured in the lower die shoe 57 are leader pins 59 providing accurate relative controlled motion between the various parts. Above the die shoe is the sub-die shoe 60 which is maintained normally a short distance above the die shoe by means of pressure applied through the pins 68 passing through the bed plate and lower die shoe and cooperating below with pressure application devices of suitable form. Fixed securely upon the lower die shoe 57 is the lower die 61. The lower die shoe and the lower die have no movement whatever during the various operations. The sub-die shoe 60 containing the contracting members 62 of the composite female die has a vertical movement in the neighborhood of about 1¼ inches, and is guided on the leader pins 59. The upper die shoe 63 has mounted thereon a punch 64 and cams 65, the parts altogether having a vertical movement equal to the full amount of the stroke of the press.

Figure 6:
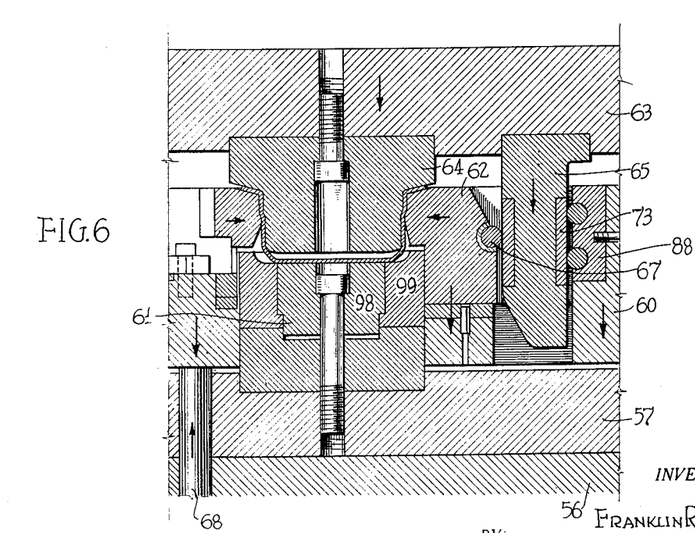
Figure 7:
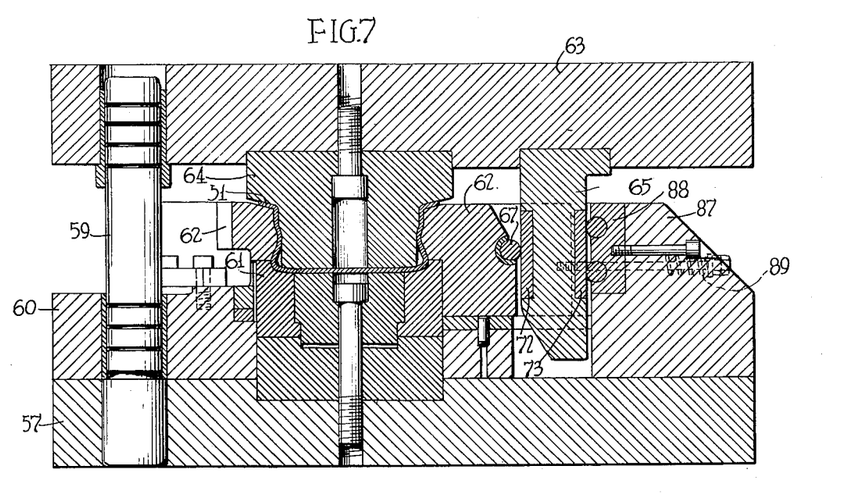

At the beginning of the operation the pre-formed shell 50 is placed in the expanded die section 62 as seen in Fig. 3, the outwardly extending flange 51 resting on top of the die parts 62 and preventing the shell from falling through the dies. The sub-die shoe 60 is approximately one and one quarter inches above the lower die shoe 57 being kept there by means of the pressure operating through the pins 68. The positioning of the parts is clearly seen in Fig. 3. One reason for the sub-die and contracting dies being suspended above the lower die section is to allow for the decrease in height of the shell, as readily seen in the comparison of Figs. 16 and 20 and to allow the contracting die 62 to be fully closed before any pressure is applied to the flat surface 55 of the blank. The upper die shoe 63 moves downwardly, and in so doing, causes the cam surface 66 to engage the rolls 67 and contract the dies 62. This operation corresponds to the position in Fig. 4. While the dies 62 are closing, the parts 63 and 64 are likewise moving downwardly. This movement continues and the punch 64 moves downwardly into the shell until the surface 70 touches the flange of the shell, at which moment the contracting dies 62 are fully closed and the part 60 begins to be pushed downwardly by the pressure exerted at the surface 70 until the surface 55 of the closed end of the pre-formed blank comes in contact with the lower die 61 as seen in Fig. 6, at which time the bulging operation begins to take place. This bulging operation begins near the point 71 in the generally cylindrical body portion of the blank as seen in Fig. 16, and the parts continue to move together, completing the operation as seen in Fig. 7. The roller 67 and portions of the cam 65 comprising the parts 72 and 73 are made of hardened steel to take the wear of the various parts. During the operation just described, the blank is changed in contour from that of Fig. 16 to that of Fig. 17.

Consideration of Figs. 16 to 20, inclusive, clearly shows the importance of the pre-forming steps with regard to the satisfactory accomplishment of the bulging operation. Referring to Fig. 16, the shell resulting from the initial or pre-forming operation being substantially a bell-shaped member will, if pressure is applied against the flat end portion 55, be reduced in axial extent, i. e., in the overall length and will be reduced from the depth of Fig. 16 to that of Fig. 17, which reduction is clearly visible in Fig. 20, wherein the parts are shown. During such an operation it is inherent that metal will be displaced and if controlled, will assume some definite shape. For this purpose the dies are so constructed that the shape of Fig. 17 will be assumed.

The changing in the shape will preferably begin in an annular zone substantially about the point 71 of Fig. 16 corresponding to the point at which the diameter of the shell will start to bulge outwardly. The ultimate shape of the bulged portion 48 is, of course, controlled by the contour of the outer die. As the inner punch is merely a straight punch it has no contact with the inside of the shell beyond the point 71. The angle of the portion 54 with respect to a surface including the flat end portion 55 is most important to insure that the portion 54 will be pressed firmly outward against the die and will move outwardly throughout the entire stroke of the press to form the bulge 48, instead of collapsing upwardly and inwardly. To form the bulge it is essential that the deformation commence at point 71 and that the successive adjoining portions of the wall toward part 54 roll into contact with the die as the press closes. Maximum forming pressure is transmitted from part 55 of the blank through part 54 by having the latter as nearly perpendicular to the bulge-forming portion of the die section 62 as possible, as shown in Fig. 6. The angle between section 54 of the blank and this portion of die section 62 must always, however, even upon closest approach of parts 60 and 57, remain slightly acute to eliminate all possibility of the part 54 collapsing inward and upward especially near the end of the press stroke. The exact angle and shape for this preliminary forming must be arrived at by a careful consideration of the dimensional factors of the shell and its various formation stages and additionally by tests.

Figure 8:
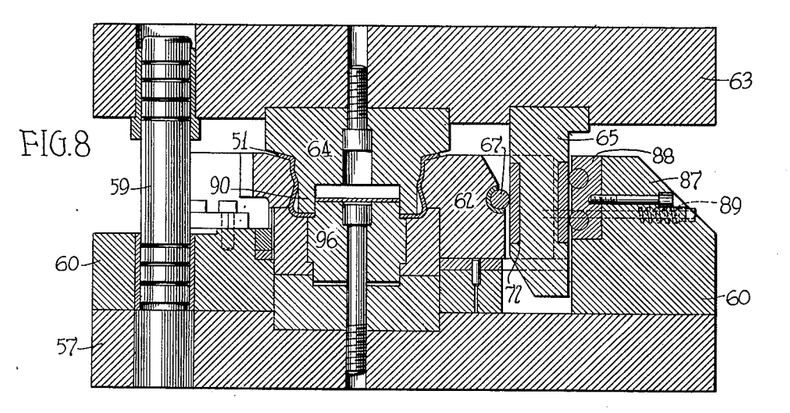
Fig. 8 shows a variation of the bulging dies.
Figures 14, 19:
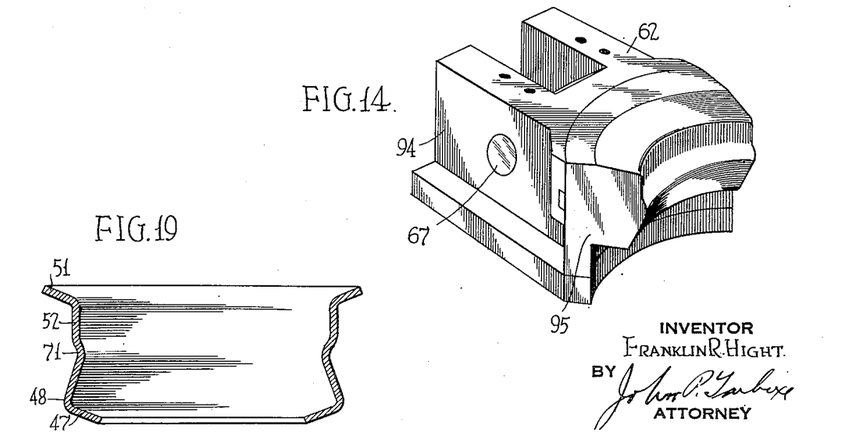
Fig. 14 illustrates a portion of one of the contracting die members.
Fig. 19 shows the blank in a slightly different order of method.
Figure 17:
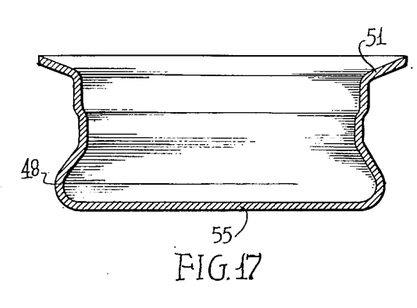

One order of procedure may involve the transposition of the piercing step as a combination with the bulging operation, as seen in Fig. 8, in which instance a disc portion corresponding to 49 would be removed by die parts 90 and 96 from the blank of form shown in Fig. 17 resulting in a product similar to that shown in Fig. 19. The last operation under these circumstances would merely be trimming and coining.

Figures 11, 15:
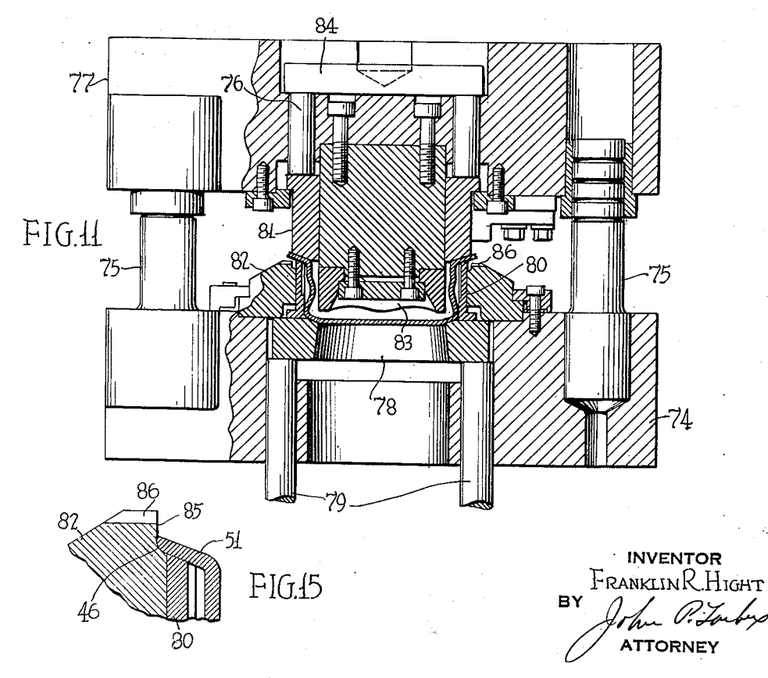
Figs. 11 and 12 illustrate steps of piercing, coining and trimming.
Fig. 15 shows in greater detail the coining operation.
Figure 22:
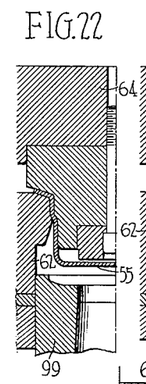
Figs. 22, 23 and 24 show the operations of Fig. 8 with a modified die arrangement.
Figure 23:
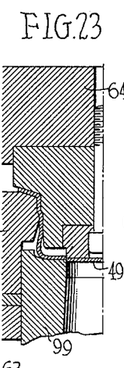
Figure 24:
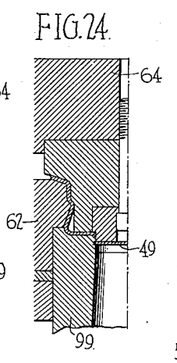

A further variation of the procedure illustrated in Fig. 8 may involve the use of a composite upper die and a lower die assembly utilizing structures somewhat similar to Figure 11 wherein the bulging and piercing operations take place in one combined die step operation and wherein it pierces the hub shell downwardly instead of upwardly. In such an arrangement as is clearly seen in Figs. 22, 23 and 24, a first or partial bulging of the shell takes place and then the shell is pierced downwardly, freeing the metal of the disc portion 49 and allowing substantially unrestricted radial movement, which unrestricted movement is utilized in the final stage of the bulging operation, as shown in Fig. 24. This latter method of procedure is preferable to the initially described procedure of Figure 8 in some respects, but the exact procedure in the method of construction essentially involves a coordination of blanked diameters and hub shell diameters both before and after bulging, and the angles in the pre-formed blank, etc. This method is somewhat less preferable to the method wherein the piercing and coining and trimming occur in one die operation and the bulging in another operation in contradistinction to where the bulging and piercing occur in one operation and the trimming and coining in another. Various hub shapes are attainable by slightly varied designs of dies when using the methods disclosed.

Another order of procedure involves piercing of the bottom of the member prior to the bulging operation, then bulging, and then trimming and coining in the final operation, although this latter order of procedure is more costly and involves more handling.

Figure 5:
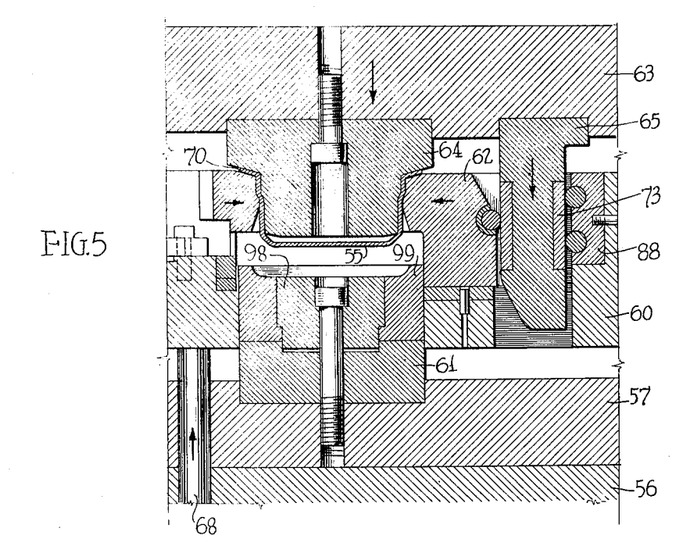
Figure 9:
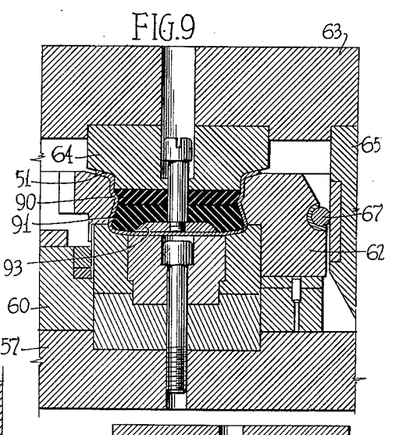
Figs. 9 and 10 show a set of bulging dies having a flexible male die member.
Figure 10:
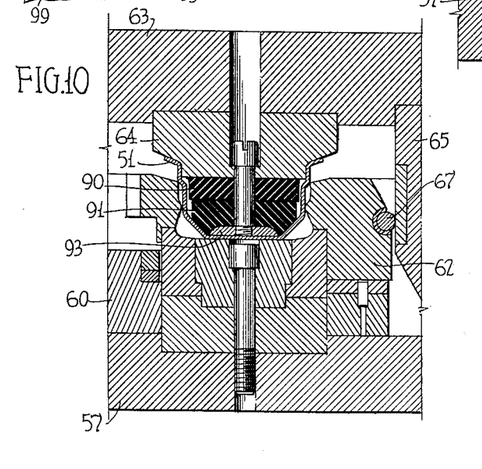
Figure 21:
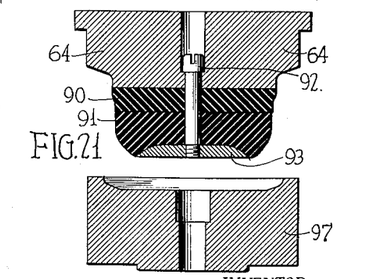
Fig. 21 shows a variation of the die parts of Figs. 9 and 10.

For the attainment of hub dimensions wherein the bulged diameter of the finished product is materially greater than the diameter of the preformed blank and wherein the bulging starts in a zone closer to the open side of the pre-formed blank, additional die changes are desirable. This is accomplished by the showing of Figs. 9 and 10 and involves the use of a deformable non-compressible inner die of such dimension as to volumetrically just fill the finished hub shell of the second operation without exerting any substantial internal pressure during the die operation per se. As there are limits to the amount of bulging to which the shells can be subjected, depending upon the ratio of the initial and final diameters and the length of the bulge, considerable difficulty is entailed in the evolution of the necessary punch or die shape to properly preliminarily form the shell. In Figs. 9 and 10 the metal body of the punch or male die member 64 is reduced in axial extent and has positioned thereupon two rubber discs 90 and 91, preferably of hard and soft rubber, respectively, and preferably of smaller and larger thickness respectively, positioned by a central pin 92 and retained in place by a disc 93. The die member 64 may also take a composite construction as in Fig. 21, having the corresponding parts similarly numbered, with the lower die 61 being a single member 97 instead of a composite member 98 and 99, as shown in Figs. 5 and 6. These members move interiorly of the shell during the bulging operation and although assisting in the avoidance of buckling, do not apply internal pressure to any extent during the bulging operation, the bulging being determined basically by the pre-formed shape and the contouring of the various external die elements.

Figure 12:
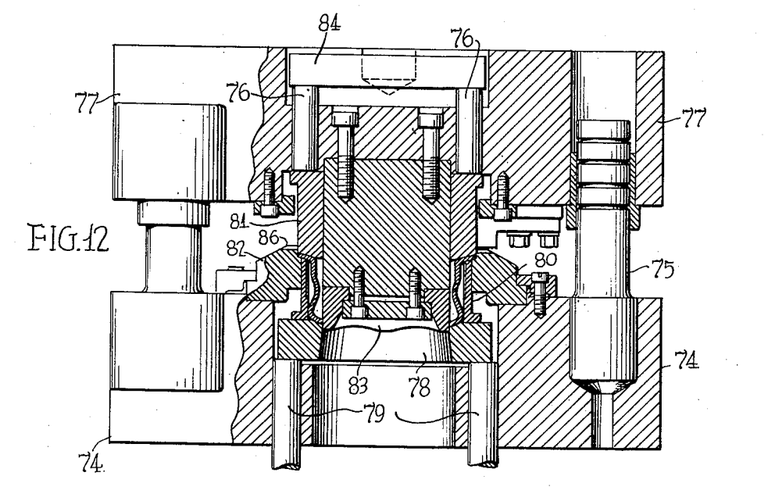
Figure 18:
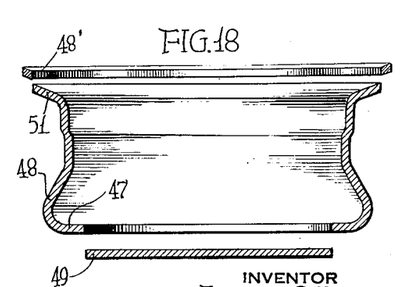

After the completion of the bulging operation the final operation of my preferred method of procedure involves the subject matter shown in Figs. 11 and 12, and includes the trimming of flange 51 to remove the annulus 48', the piercing of the bottom 55 to remove the disc shaped member 49, and the coining of the remaining flange 51 of Fig. 18 as is clearly shown in Fig. 15. This operation involves the transformation of the blank of Fig. 17 to the final product of Fig. 18 and involves the following described die operation.

Referring to Figures 11 and 12, a die structure comprises a stationary base 74 and guide rods 75 that are secured to the stationary member and telescopically fit openings in a vertically reciprocable carriage 77. A ring die 78 is supported on the piston rods 79 of a hydraulic press and carries a second ring or tubular die 80. A tertiary ring die 82 is stationarily mounted on the base 74 in telescopic relation to the die 80.

A ring or die 83, having a curvilinear lower annular cutting edge, is fixed to the carriage 77, as by blocks and screws, and is surrounded by a ring die 81 that is suitably mounted on the carriage 77, as by longitudinally-movable plungers 76 carried by a cross bar 84, to have lost-motion or longitudinal movement relative to the die 83. The bar 84 is biased downwardly, as by a spring, or other means, toward the position indicated in Fig.

11. The die 82 has an annular cutting edge 85, radial knife edges 86 and annular shoulders 46 of curved section, as indicated more clearly in Fig. 15.

In operation, with the shell of Figure 17, positioned relative to the other parts, as shown in Fig. 11, downward movement of the carriage 77 first embraces the flange 51 between the dies 80 and 81, and momentarily stops movement of the die 81, while the die 83 continues downward movement relative thereto to perform a final trimming, cutting or shaping operation on the flange 47 and to move the die 78 to its lowermost position. The die 81 then moves downwardly to first perimetrally trim, and radially split the trim portion of the flange 51, by the cutting edges 85 and 86, respectively, and then to press the edge of the flange to shape against the shoulder 46; the resultant hub shell being shown in Fig. 18.

In connection with the above-described die structure, method and hub shell, a novel feature resides in producing the radially-outwardly-extended section or annular portion 48 by simultaneous axial and radial pressures initiated from the exterior of the shell, and without backing the interior of the shell at this point. This is in contradistinction to more complicated and expensive methods of producing such figures by internal fluid pressure or by a collapsible inner die. This feature in combination with the feature of removing the bottom of the cup in the one operation, contributes to the efficacy of the method and to the reduction in the number of times the shell must be handled by one order of steps. The radially movable dies, together with the fixed die are, in effect, components of a single composite female die providing the shell shape at this stage of its manufacture.

In the stages of Figures 11 and 12, the laterally inner and outer flanges 51 and 47, at the respective ends of the shell are worked, in one operation, in a manner further facilitating manufacture and reducing the number of separate fabricating and handling operations. In the structure of these figures also, the dies 78, 80 and 82 are components of a single composite female die cooperating with a composite male die including the relatively movable parts 83 and 81.

Figure 13:
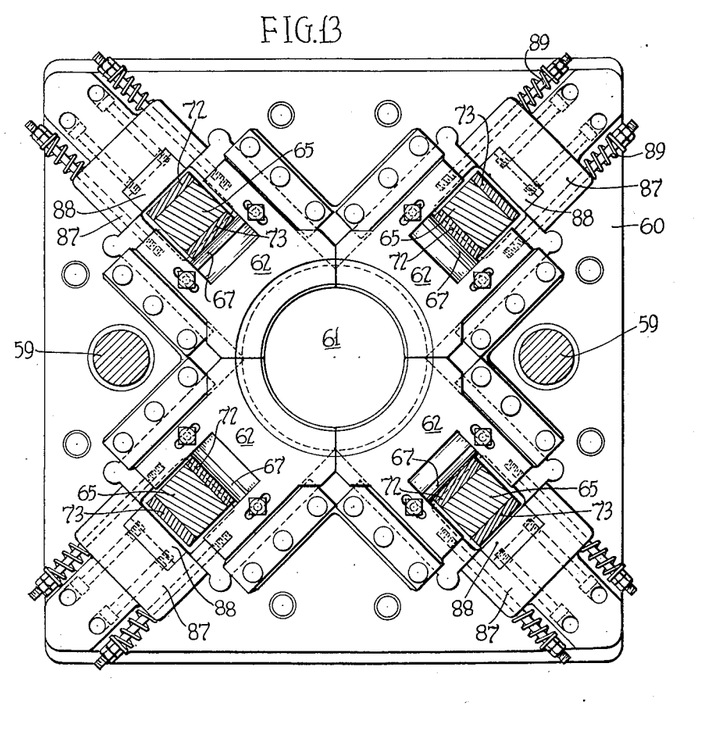
Fig. 13 illustrates a plan view of the external dies.

A plan view and illustration of one of the composite portions respectively of the female or contracting die are shown in Figs. 13 and 14. This view illustrates the manner in which the parts 62 move radially when urged to such movement by the cam members 65 in their downward movement. The cam moves downwardly and is resisted in outward motion due to the elevated portions 87 to which are secured wear resisting inserts 88. Upon the completion of the forming operations during the raising of the die parts, the cam rises, and due to the springs 89 resting against the blocks 87, the die elements 62 are moved radially outwardly and the machine repositioned for a subsequent operation. The jaws 62 may preferably be of separable parts comprising the main part or slide 94 and the jaw portion 95 which is replaceable and subject to variation in form, for use with variously contoured hub shells.

The hub shell resulting from the process enumerated is free of joints. All strains due to heating from welds wherein the parts are made from a continuous member folded into tubular form and welded, are avoided and possible points of insufficient fusion as well as possible difficulties resulting from machining of such welded joints are likewise avoided, additionally, lines of sharp discontinuity of tension are also avoided. Furthermore, by the bulging operations utilizing exteriorly applied forces instead of interiorly applied forces, the parts are operated under stresses primarily of compression instead of primarily of tension. Very improved characteristics of the structure naturally readily result.

The drawings have illustrated a specific embodiment of my invention which is a preferred embodiment at the present time, but it is obvious that variations and modifications within the true spirit and scope of my invention intended to be covered in the annexed claims are not to be limited by their circumspective terminology.

What I claim is:

1. The method of making a sheet metal wire wheel hub shell or a like generally tubular product having at one end thereof an outwardly flaring flange, a generally cylindrical body portion extending from said flange toward the opposite end of said object and an outwardly bulged portion extending from said generally cylindrical portion and disposed adjacent said opposite end and terminating in a radially inwardly directed flange, which comprises the step of preforming from flat sheet stock a generally bell-shaped blank, said preformed blank having an outwardly flaring flange at its one end corresponding to the flaring flange of the final product, a generally cylindrical portion corresponding generally to the cylindrical portion of the final product but of greater axial extent, a generally frusto-conical portion extending from said generally cylindrical portion and a flat end portion connecting the margins of said frusto-conical portion, the over-all axial depth of the preformed blank exceeding the corresponding depth of the final product, and the step of operating upon said preformed blank so shaped while firmly holding its flaring end flange and a portion of the generally cylindrical portion extending therefrom to bring pressure to bear upon the axially opposite ends of the blank including the flat end portion and convert, solely through such endwise pressure, said frusto-conical portion and a portion of the cylindrical portion of the blank adjacent thereto into the outwardly bulged portion of the final product.

2. The method according to claim 1 which comprises the further step of shearing the closed end of the preformed blank to leave only the radially projecting flange.

3. The method according to claim 1 which comprises the further step of trimming the outwardly flaring flange and coining the trimmed edge in one operation.

4. The method according to claim 1 which comprises the further step of shearing the closed end of the preformed blank, trimming the outwardly flaring flange and coining the trimmed edge all in one operation.

5. The method according to claim 1 which comprises smoothing out the bulged portion by uniformly applied internal pressure to said portion only after the bulging has been substantially completed by the axially directed pressure.

FRANKLIN R. HIGHT.